United States Patent [19]

Nishimura

[11] Patent Number: 5,181,153
[45] Date of Patent: Jan. 19, 1993

[54] MAGNETIC TAPE CASSETTE WITH NOVEL TAPE REEL MOVEMENT LIMITING MEANS

[75] Inventor: Akihiro Nishimura, Higashi-Osaka, Japan

[73] Assignee: Matsushita Electric Industrial Co., Ltd., Osaka, Japan

[21] Appl. No.: 657,787

[22] Filed: Feb. 21, 1991

[30] Foreign Application Priority Data

Feb. 21, 1990 [JP] Japan .................................. 2-39946

[51] Int. Cl.⁵ .............................................. G11B 23/08
[52] U.S. Cl. .................................. 360/132; 360/137; 242/199
[58] Field of Search ......... 360/132, 137, 130.3–130.34; 242/197–200

[56] References Cited

U.S. PATENT DOCUMENTS

| 4,535,370 | 8/1985 | Gervais | 360/132 |
| 4,648,000 | 3/1987 | Shibaike et al. | 242/199 |
| 4,662,579 | 5/1987 | Gelardi et al. | 360/132 |
| 4,672,498 | 6/1987 | Harada | 360/132 |
| 4,707,757 | 11/1987 | Shiba et al. | 360/132 |
| 4,802,044 | 1/1989 | Iwahashi et al. | 360/132 |
| 4,896,238 | 1/1990 | Oogi et al. | 360/132 |
| 4,899,243 | 2/1990 | Bordignon | 242/199 |
| 5,027,249 | 6/1991 | Johnson et al. | 242/199 |

FOREIGN PATENT DOCUMENTS 2169583  7/1986  United Kingdom ................ 360/132

*Primary Examiner*—A. J. Heinz
*Assistant Examiner*—Alfonso Garcia
*Attorney, Agent, or Firm*—Wenderoth, Lind & Ponack

[57] ABSTRACT

A tape cassette which includes a cassette shell housing in which reels wound with a magnetic tape are incorporated, a depressing member for depressing an upper surface of each reel, and a reel displacing amount reducing member having its one end engaged with the depressing member, and its other end, exposed on an upper surface of the cassette shell housing through a through-hole formed in the cassette shell housing. The amount of displacement of the reels is reduced by restricting displacement of the exposed portion of the reel displacing amount reducing member.

18 Claims, 25 Drawing Sheets

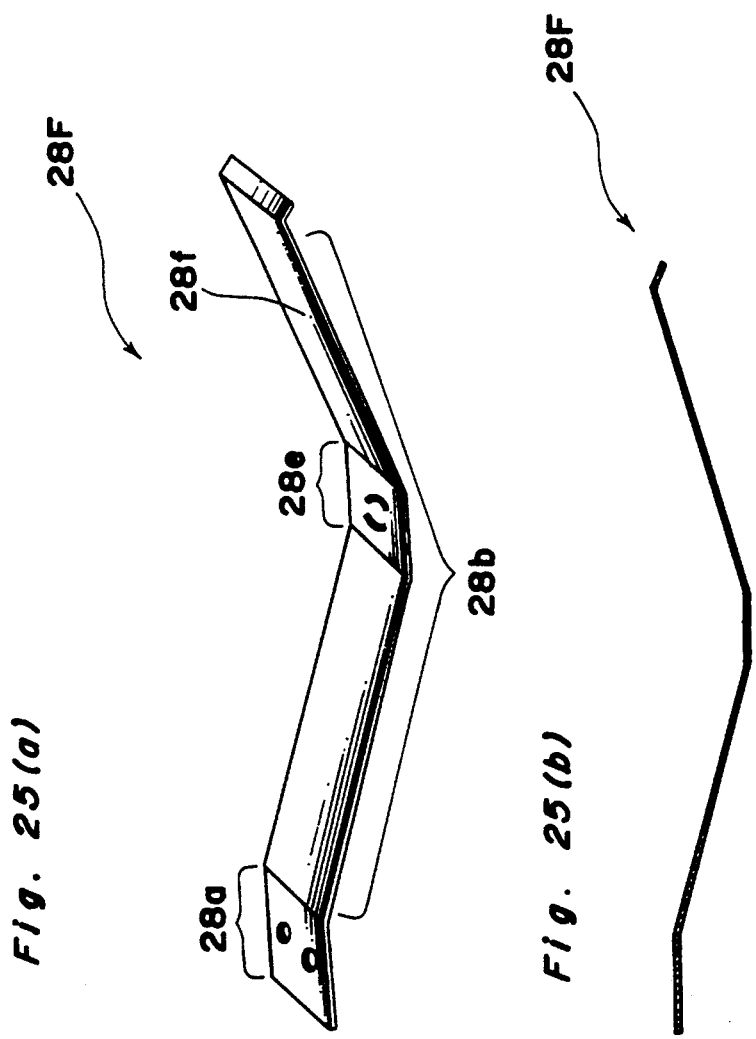

MAGNETIC TAPE CASSETTE WITH NOVEL TAPE REEL MOVEMENT LIMITING MEANS

BACKGROUND OF THE INVENTION

The present invention generally relates to a magnetic tape cassette, and more particularly to a tape cassette most suitable for use in a magnetic recording and reproducing apparatus such as a video tape recorder or the like, and especially characterized in having a depressing means for reels accommodated in a cassette shell housing thereof.

Recently, in order to meet a strong demand from the market for higher image quality and longer operating time of a video tape, and also for compact size of video appliances, etc., there has been a tendency that the thickness of the video tape is further reduced. Accordingly, in the tape cassette for accommodating such a thin magnetic tape, it has been required to introduce various improvements in order to achieve a high performance.

By way of example, constructions of conventional tape cassettes will be described hereinafter with reference to FIGS. 1 to 4.

CONVENTIONAL EXAMPLE I

As shown in FIG. 1, in a conventional tape cassette for use in a video tape recorder (referred to as VTR hereinafter), the lower end of each reel 3 wound with a magnetic tape 2 and provided within a cassette main body or cassette shell housing 1 (referred to as a cassette shell housing hereinafter) is inserted into a circular opening 1a formed in a bottom wall of the cassette shell housing 1, and the reel 3 is depressed at its central portion, by a plate spring 4 attached to the upper wall of the cassette shell housing, thereby to press a lower flange portion 3a of the reel 3 against the bottom wall of said cassette shell housing.

Then, when the tape cassette is loaded on a VTR in the known manner, each reel 3 is placed on a reel receiving face 5a of a reel base 5 at an under face 3b of the reel 3, and the reel 3 is pushed up from the bottom wall of the cassette shell housing 1 against the force of the plate spring 4, and thus, the lower flange 3a of the reel 3 is spaced from the bottom wall of the cassette shell housing 1, thereby to bring the reel 3 into a rotatable state.

However, in the conventional arrangement as described above, in a single tape cassette as it is, since each of the reels 3 is movable within the cassette shell housing 1 against the plate spring 4, the reels tend to vertically move when vibration or impact is applied thereto during transit, thus resulting in damage to the magnetic tape wound on the reels 3.

On the other hand, in the state where the tape cassette is loaded on the VTR as shown in FIG. 2, the direction of the force of the plate spring 4 for depressing the center of the reel 3 is indicated by an arrow A, since the movement of a free end of the plate spring 4 is in an arcuate direction. Thus, due to the depression of the reel 3 in the direction of A, the fit between the reel 3 and the reel base 5 is in an eccentric state, and consequently, the travelling of the magnetic tape 2 paid out from the reel 3 is not stabilized.

Hereinafter, another conventional tape cassette in which the problem as described above is eliminated will be explained with particular reference to FIGS. 3 and 4.

CONVENTIONAL EXAMPLE II

As shown in FIG. 3, the known tape cassette in which the above problem has been solved has the lower end of each reel 7 provided within a cassette shell housing 6 inserted into a circular opening 6a formed in a bottom wall of the cassette shell housing 6, and the reel 7 is depressed by a reel depressing member 9 engaged, at its one end, in a round opening 8a of a window portion 8 provided on a top wall of the cassette shell housing 6 and pressed, at its other end, against the central portion of the reel 7, with a coil spring 10 disposed between the top wall of the cassette shell housing 1 and the lower edge of the reel depressing member 9, thereby to depress a lower flange portion 7a of the reel 7 against the bottom wall of the cassette shell housing 6.

Thus, when the cassette shell housing 6 is accommodated in a cassette storing case (not shown) in the above state, the upper surface (including the upper face of the reel depressing member 9) of the cassette shell housing 6 contacts the inner face of an upper cover (not shown) of the cassette storing case so as to prevent a vertical movement of the reel 7, and moreover, to protect the tape cassette against any damage due to the vertical movement of the reel 7 during transportation or the like.

When the tape cassette is loaded on a VTR in the known manner, each reel 7 is placed on a reel receiving face 11a of a reel base 11 at an under face 7b of the reel 7, and the reel 7 is pushed up from the bottom wall of the cassette shell housing 6 against the coil spring 10 and the reel depressing member 9, and thus, the lower flange 7a of the reel 7 is spaced from the bottom wall of the cassette shell housing 6, thereby to bring the reel 7 into a rotatable state. Moreover, owing to the employment of the coil spring 10, a spring force B acts downwardly along a center line 7c of the reel 7, and thus, no eccentricity is produced in the fitting between the reel 7 and the reel base 11.

However, in the known arrangement as described above, there has been a problem that, since stress is concentrated upon the central portion of the upper wall of the cassette shell housing 6 (including the window portion 8) by the coil spring 10, such upper wall central portion of the cassette shell housing 6 is substantially deformed as shown in FIG. 5, if the tape cassette is stored for a long period and under high temperature, thus making it impossible to properly load the tape cassette onto the VTR main body.

As is known, the cassette shell housing 6 and the transparent window portion 8 for the confirmation of the remaining amount of magnetic tape, etc. are made of a resin material, and for the window portion 8, a transparent resin material having sufficient rigidity and heat resistance must be selected so that it is not readily subjected to deformation even when applied with the concentrated stress of the coil spring 10. However, a resin material of a transparent grade is generally inferior in heat resistance and rigidity, even if it is the same kind of resin, and if such a transparent window portion is provided at the central portion of the cassette shell housing 6, a still larger deformation tends to take place thereat.

Additionally, as shown in FIG. 4, the reel 7 and the reel depressing member 9 are normally made of resin material as is well known, and when the members made of such resin material are slid against each other, sliding resistance tends to be increased. Therefore, a sliding metallic member 12 is attached to the upper surface of the reel 7 for sliding movement between the metallic material and the resin, thereby to reduce the sliding resistance.

However, providing such sliding metallic member 12 undesirably results in a cost increase.

Additionally, a large protruding portion 8b is required for accommodating the coil spring 10 and the reel depressing member 9, thus complicating the configuration of the window portion 8. Moreover, since the protruding portion 8b projects towards the reel 7, the central portion of the reel 7 becomes concave, and consequently, a depth C of a fitting bore 7d for fitting with the reel base 11 becomes short, thus resulting in a problem that the desired fitting with respect to the reel base can not be obtained.

SUMMARY OF THE INVENTION

Accordingly, an essential object of the present invention is to provide a tape cassette in which any damage to a magnetic tape due to a vertical movement of reels during transit, etc. is advantageously eliminated.

A second object of the present invention is to provide a tape cassette of the above described type in which eccentricity in fitting between the reel and reel base can be eliminated.

A third object of the present invention is to provide a tape cassette of the above described type in which deformation of the cassette shell housing is advantageously prevented.

A fourth object of the present invention is to provide a tape cassette of the above described type in which no particular metallic part exclusively for sliding movement is required.

A fifth object of the present invention is to provide a tape cassette of the above described type in which the shape of the cassette shell housing in the vicinity of the portion for attaching a reel displacing amount reducing means is simplified for facilitation of processing and assembly.

A sixth object of the present invention is to provide a tape cassette of the above described type in which the amount required for fitting with the reel base is sufficient for stabilized loading of the tape cassette.

A seventh object of the present invention is to provide a tape cassette of the above described type which is simple in construction and stable in functioning, and can be readily manufactured at low cost.

In accomplishing these and other objects, according to one preferred embodiment of the present invention, there is provided a tape cassette which includes a cassette shell housing in which a reel means wound with a magnetic tape thereon is incorporated, a depressing means for depressing an upper surface of the reel means, and a reel displacing amount reducing means having its one end engaged with the depressing means, and its other end, exposed on an upper surface of the cassette shell housing through a through-hole formed in the cassette shell housing. The amount of displacement of said reel means is arranged to be reduced by restricting displacement of the exposed portion of the reel displacing amount reducing means.

By the arrangement according to the present invention as described above, effects as follows can be achieved.

(1) When the tape cassette is housed in the cassette storing case, by engaging the exposed portion of the reel displacing amount reducing means with the inner face of the storing case, the vertical movement of the tape can be suppressed for prevention of damage to the magnetic tape.

(2) By bending the reel displacing amount reducing means attaching portion of the plate spring approximately at right angles with respect to a center line of the reel, eccentricity at the fitting portion with respect to the reel base is prevented.

(3) By attaching one end of the plate spring at the side face portion, corner side portion, or clamping portion between the upper and lower halves, which generally have large rigidity in the cassette shell housing, deformation of the cassette shell housing can be prevented.

(4) Owing to the arrangement which causes the plate spring to directly slide against the reel, a sliding metallic member is dispensed with which promotes cost reduction.

(5) Since the attaching position of the plate spring to the cassette shell housing, and that of the plate spring and the reel displacing amount reducing means are respectively at different positions, the shapes at the respective attaching portions are simplified.

(6) For the reason as stated in the above item (5), the reel may be formed into a shape to which the reel base can be fitted stably.

BRIEF DESCRIPTION OF THE DRAWINGS

These and other objects and features of the present invention will become apparent from the following description taken in conjunction with the accompanying drawings, in which;

FIG. 25(a) and 25(b) are a perspective view and a side sectional view of a plate spring according to another modification of the present invention.

DETAILED DESCRIPTION OF THE INVENTION

Figure 1:
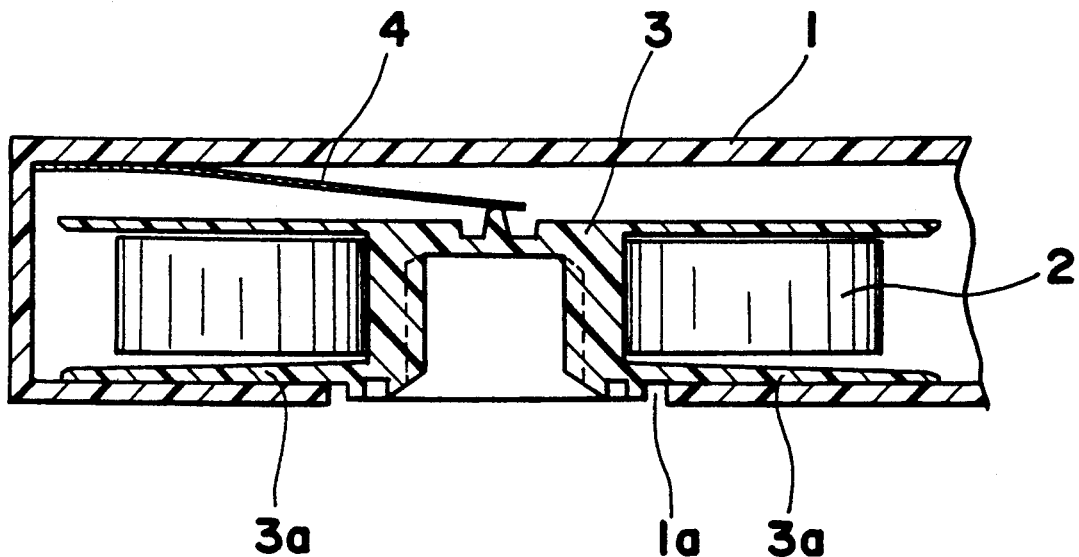
FIG. 1 is a fragmentary side sectional view showing an essential portion of one example of a conventional tape cassette (already referred to)

Before the description of the present invention proceeds, it is to be noted that like parts are designated by like reference numerals throughout the accompanying drawings.

Embodiment I

Figure 6:
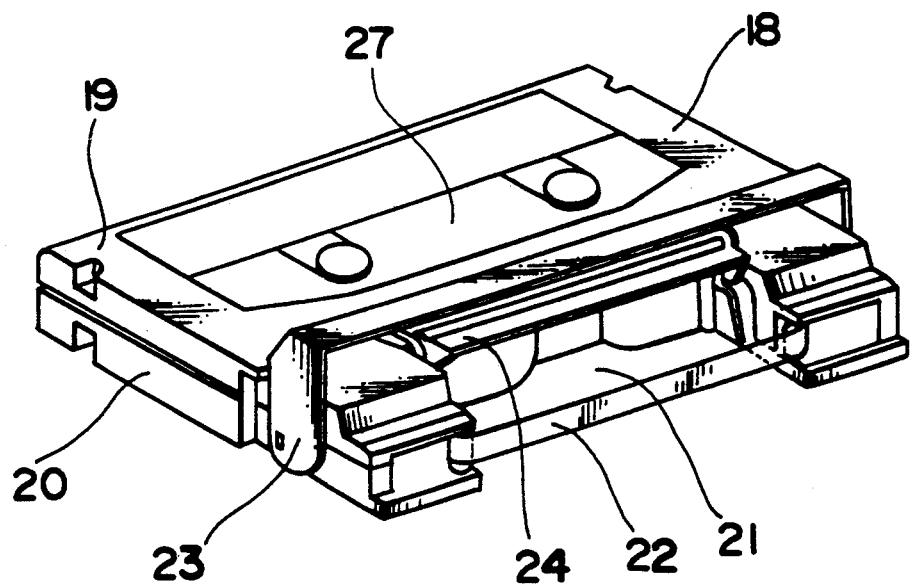
FIG. 6 is a perspective view of the tape cassette according to the one preferred embodiment of the present invention.
Figure 7:
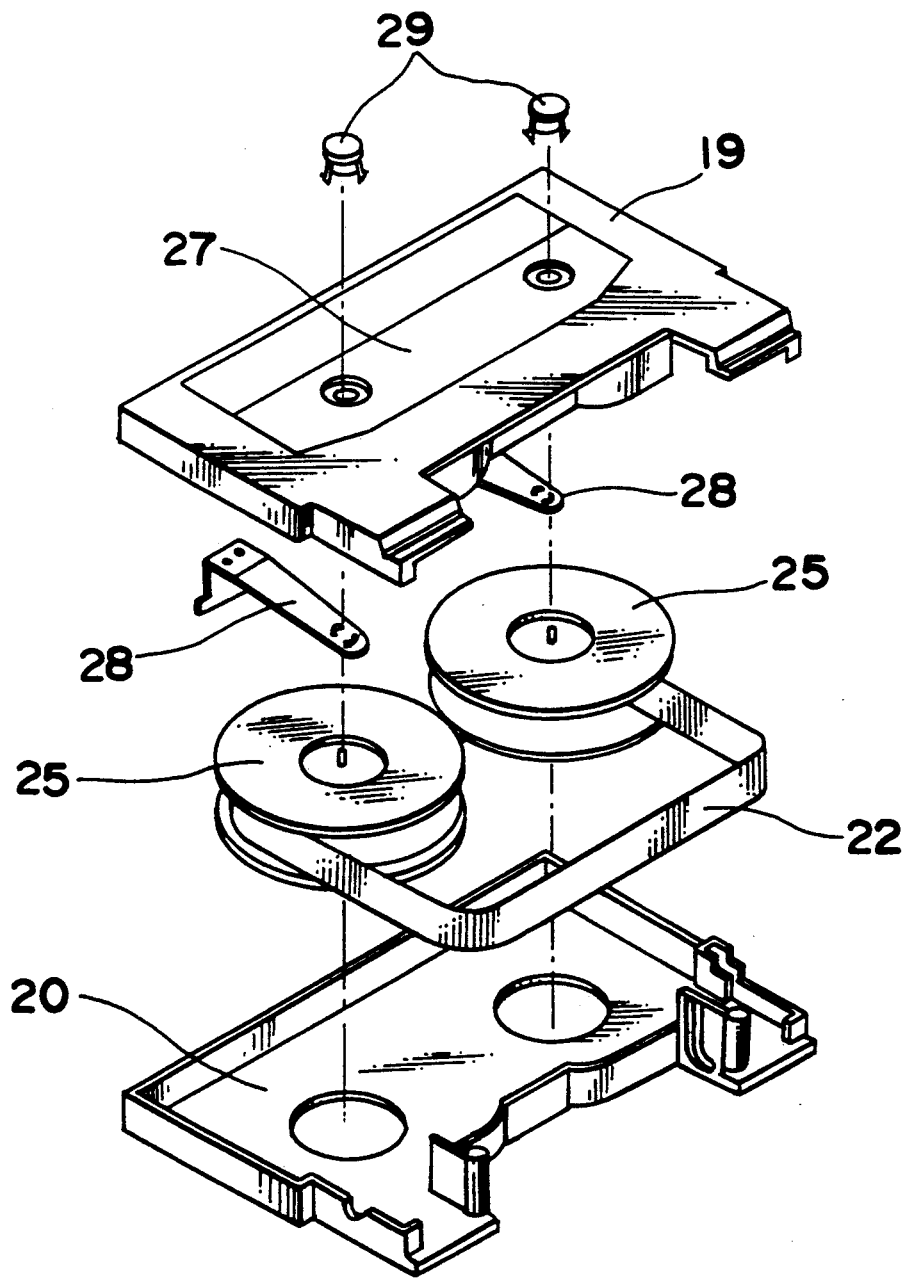
FIG. 7 is an exploded perspective view of the tape cassette in FIG. 6.
Figure 8:
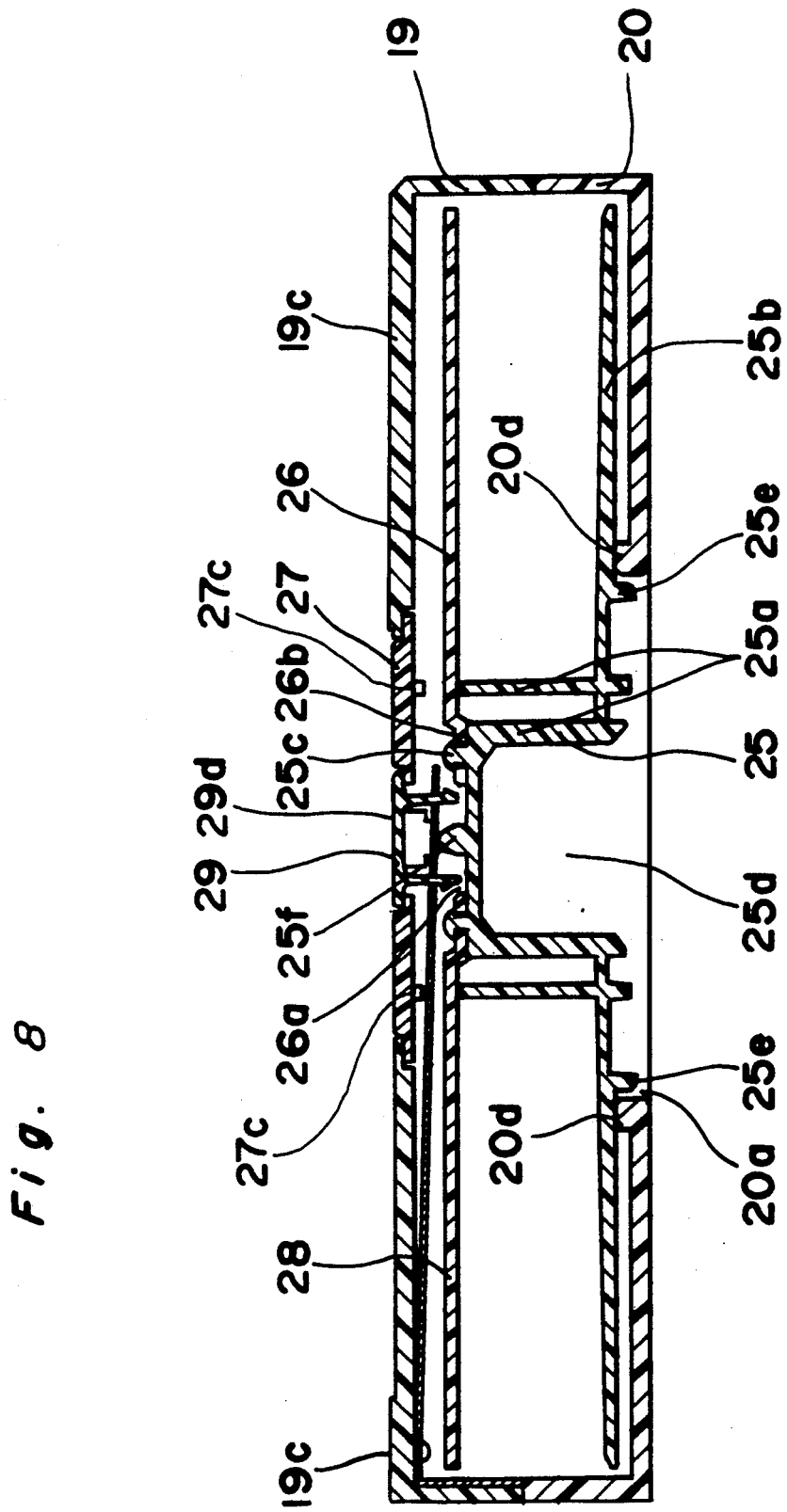
FIG. 8 is a side sectional view showing, on an enlarged scale, of an essential portion of the tape cassette of FIG. 6.

Referring now to the drawings, there is shown in FIGS. 6 to 8, a tape cassette according to one preferred embodiment of the present invention, which generally includes an upper half portion 19 (and also a window portion 27) and a lower half portion 20 molded of a synthetic resin material, and combined with each other to constitute a cassette shell housing 18, in which a reel means, i.e. a pair of reels 25 also made of a synthetic resin material and wound with a magnetic tape 22 are accommodated (FIGS. 7 and 8).

At a front face of the cassette shell housing 18, there is provided an elongated opening portion 21 along which the magnetic tape 22 is movably extended, and which is normally covered by a front cover 23 and a rear cover 24 pivotally provided as described more in detail later.

Each of the reels 25 referred to above is constituted by a hub portion 25a wound with the magnetic tape 22, and an upper flange 26 and a lower flange 25b respectively provided at corresponding upper and lower ends of said hub 25a. More specifically, the lower flange 25b is integrally joined at an inner peripheral edge to the lower end of the hub 25a, while the upper flange 26 is concentrically fixed as one unit with the hub 25a by fitting a plurality of holes 26b formed on a peripheral edge of a central circular opening 26a of said upper flange 26, over a plurality of corresponding projections 25c integrally formed on the outer periphery at the upper end of said hub 25a.

Moreover, at the central portion of the hub 25a, there is formed a reel spindle engaging bore 25d open at its lower end. On the under surface of the lower flange 25b, an annular rib 25e is integrally formed concentrically with the hub so as to be loosely fitted in each of a pair of reel base inserting holes 20a formed in the lower half portion 20 and having an annular protrusion 20d therearound for receiving the lower flange 25b.

In the upper half portion 19, the transparent window 27 also made of a synthetic resin material is formed to enable viewing of the amount of magnetic tape remaining on the hubs.

On the upper portions of the reels 25, a pair of metallic plate springs 28 each having a generally L-shaped cross section, and also, a pair of reel displacing mount reducing members 29 made of a synthetic resin material are respectively provided.

Figure 9A:
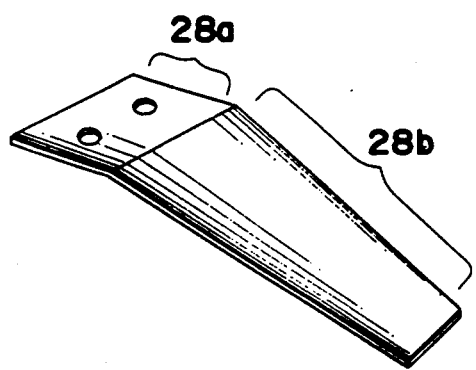
FIG. 9(a) is a perspective view of a plate spring employed in the tape cassette of FIG. 6.
Figure 9B:
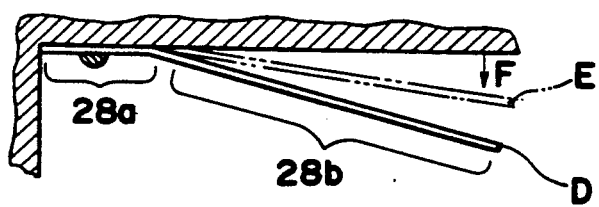
FIG. 9(b) is a side elevational view for explaining the functioning of the plate spring of FIG. 9(a)

In FIGS. 9(a) and 9(b), there is shown one fundamental example of the plate spring for explaining the principle of functioning of such plate spring. The plate spring shown here includes a spring portion or free end portion 28b and a flat support portion 28a. It should be noted here that the plate spring may be modified in various ways e.g. to that shown in FIG. 10, or to those to be described later with reference to FIGS. 21(1a) to 22(b) and 25(a) and 25(b), etc. The plate spring of FIGS. 9(a) and 9(b) is so formed as to be fixed at its support portion 28a to a certain member (not shown), thereby to utilize a force F for restoration obtained when the free end 28b is deformed from a state D (non-loaded state) to a state E as shown.

In the plate spring 28 of the present invention as shown in FIG., the support portion 28a is inserted into grooves 19a (FIG. 10) formed on the inner wall of the upper half portion 19 for temporary mounting of said plate spring 28.

Figure 10:
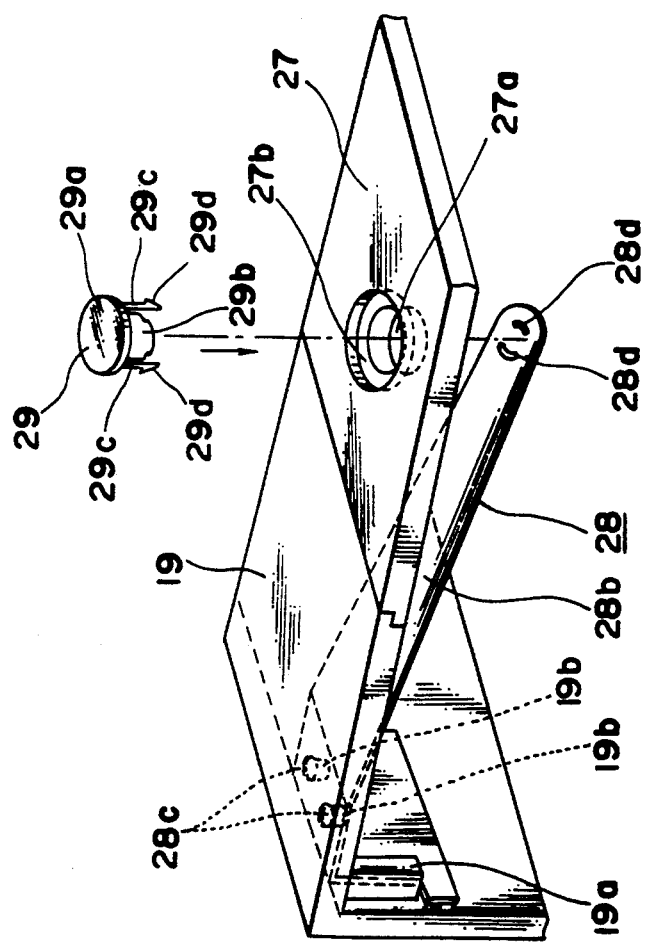
FIG. 10 is a fragmentary perspective view showing, on an enlarged scale, an arrangement of the plate spring and a reel displacing amount reducing member and the attachment thereof to the cassette shell housing.

In the above case, a pair of projections 19b provided on the upper half portion 19 are also fitted into corresponding holes 28c formed in the support portion 28a of the plate spring 28 of either FIG. 9a or 10, and in this state, forward ends of the projections 19b are fused so as to be enlarged, thereby to fix the plate spring 28 onto the upper half 19.

Figure 11:
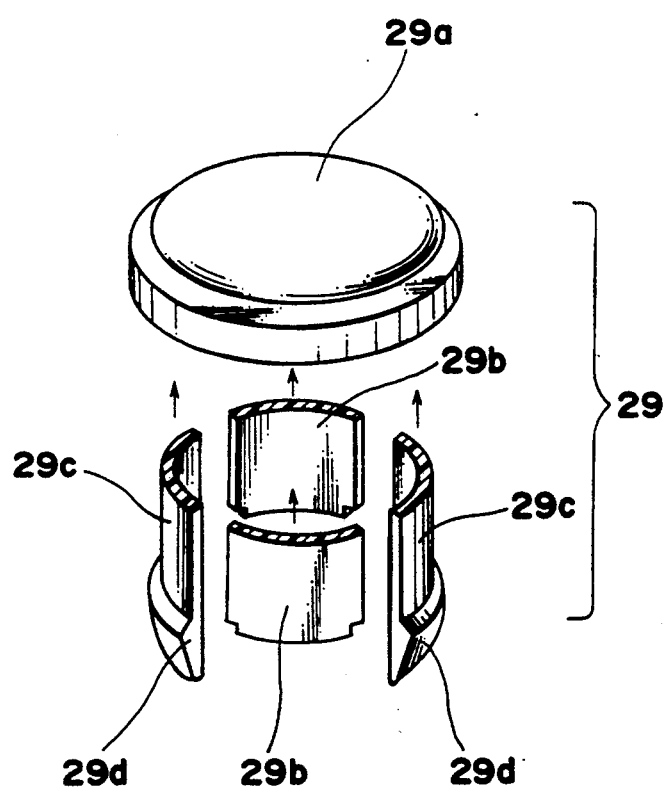
FIG. 11 is an exploded perspective view showing on an enlarged scale, the reel displacing amount reducing member according to the first embodiment of the present invention.

As shown in FIG. 11, each of the reel displacing amount reducing members 29 includes an exposed portion with a disc-like top face portion 29a formed at its upper end, and a coupling means for engaging the member 29 with the plate spring 28, which coupling means is here shown as a plurality of arcuate ribs 29b and 29c extending downwardly from the lower surface of said top face portion 29a, all of which are integrally molded into one member, and the arcuate ribs 29c are provided, at forward ends thereof, with claw portions 29d as an engaging means with the plate spring 28.

Figure 12:
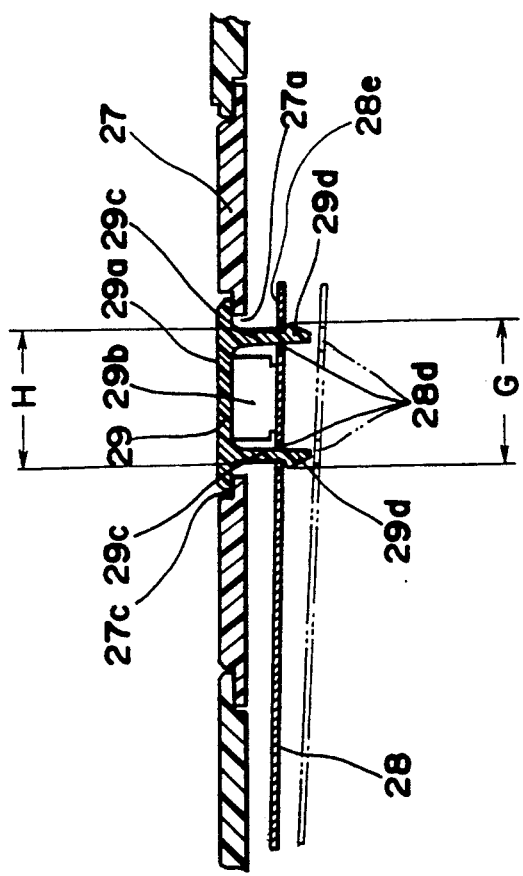
FIG. 12 is a fragmentary cross section showing attachment of the reel displacing amount reducing member to the plate spring.

For attaching each reel displacing amount reducing member 29 to the plate spring 28, the arcuate ribs 29b and 29c of the member 29 are first inserted into a hole 27a formed in the window portion 27, and in this case, since the top face portion 29a of the member 29 has a diameter larger than that of the hole 27a, it is positioned by contacting the surface of an annular recess 27b concentrically formed with the hole 27b in the window portion 27 (FIG. 12).

Subsequently, among the arcuate ribs 29b and 29c of the member 29 projecting downwardly from the under surface of the window portion 27, those having the claw portions 29d are forced into corresponding arcuate holes 28d formed at the forward end of the plate spring 28 (FIG. 10). In this case, an outer diameter or distance G between external catch portions of the claw portions 29d is set to be slightly larger than an outer diameter H or distance between outer edges of the holes 28d (FIG. 12).

When the claw portions 29d have passed through the corresponding holes 28d, the catch portions of the claw portions 29d are expanded for engagement with the outer edges of the holes 28d, and the forward ends of the arcuate ribs 29b without the claw portions 29d contact the upper face 28e of the plate spring 28, and thus, the reel displacing amount reducing member 29 is attached to the plate spring 28.

In the above arrangement, each of the plate springs 28 depresses a projection 25f provided at the central portion on the upper surface of the reel 25, thereby to press the reel 25 against the inner wall of the lower half 20. In the above state, the upper face 29d of the member 29 is generally on the same face as or flush with the uppermost face 19c of the upper half portion 19 or lower than that so as to be recessed (FIG. 8).

Figure 13:
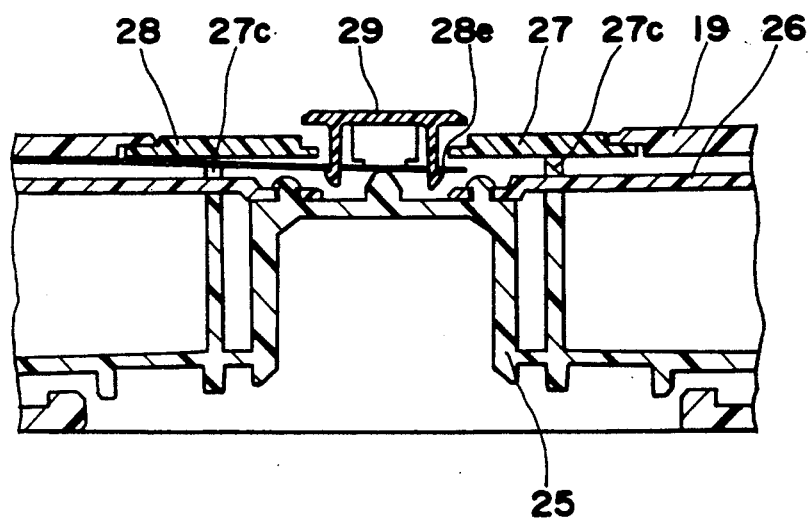
FIG. 13 is a fragmentary side sectional view of a tape cassette provided with reel displacing amount reducing projections.
Figure 14:
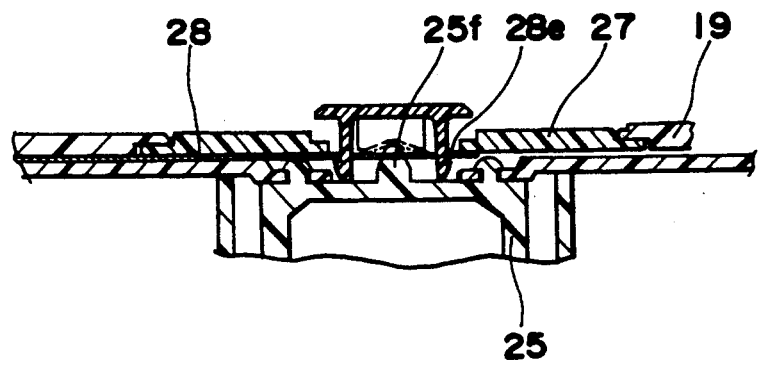
FIG. 14 is a view similar to FIG. 13, which particularly shows a tape cassette without reel displacing amount reducing projections.

Reel displacing amount reducing projections 27c project downwardly from the undersurface of the window portion 27, and as shown in FIG. 13, they contact the upper flange 26 when the reel 25 is pushed up against the plate spring 28, thereby to prevent further upward movement of the reel 25. In the above case, the upper face 28e at the forward end portion of the plate spring 28 is not in contact with the inner face of the upper half portion 19 including the window portion 27. The above arrangement is necessary, because, as shown in FIG. 14, if the projections 27c are not present, and the reel 25 is pushed up to the uppermost position, the upper surface 28e of the plate spring 28 contacts the upper half portion 19 and the inner face of the window portion 27 to be stopped in its upward movement. However, the projection 25f of the reel 25 acts to further deform the forward end of the plate spring 28, and in the worst case, deformation as indicated by a one-dotted line will occur. Thus, if such deformation of the plate spring takes place, regular spring force will not act for proper functioning. Therefore, it is arranged that the reel displacing amount reducing projections 27c and upper flange 26 of the reel 25 are first brought into contact with each other as described above.

Figure 15:
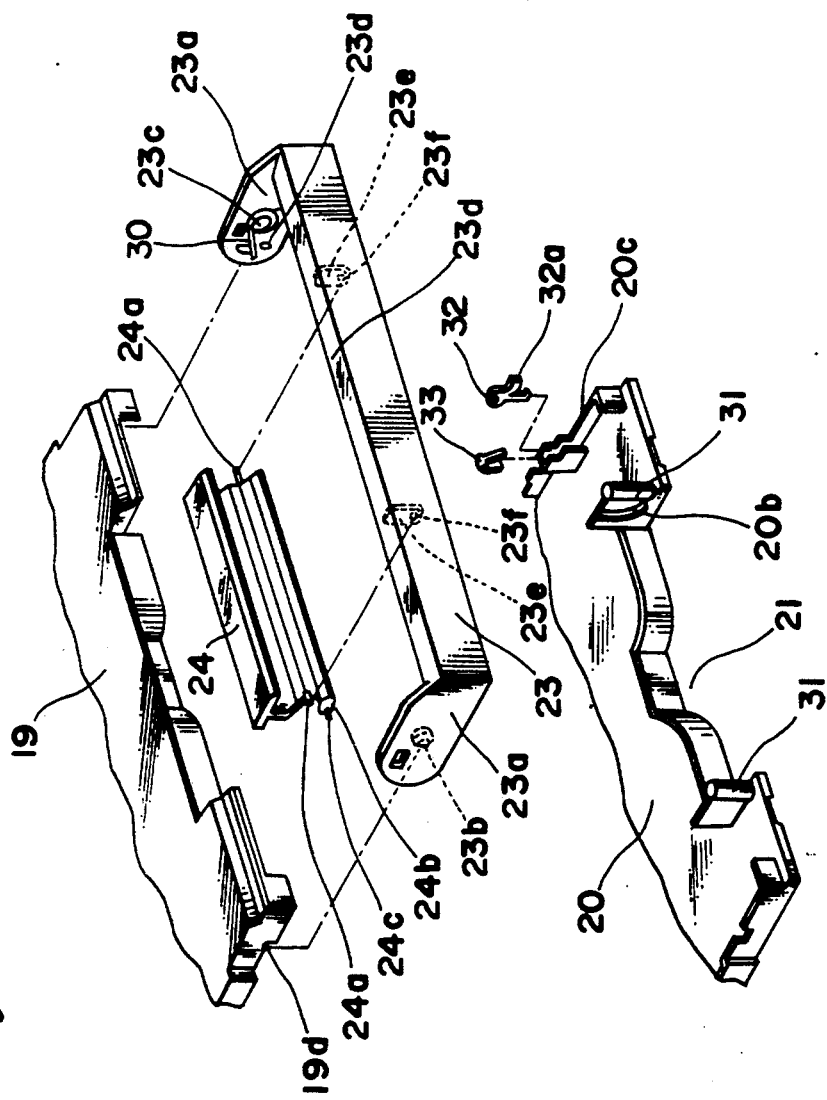
FIG. 15 is a fragmentary exploded perspective view showing an arrangement of a front cover for an upper half, and a lower half of the cassette shell housing.

As shown in FIG. 15, the front cover 23 of a generally U-shaped cross section, has a pair of support pins 23b and 23c on the opposite inner end faces 23a, and said pins 23b and 23c are received by a corresponding pair of notch portions 19d formed at opposite end faces of the upper half portion 19, whereby the front cover 23 is adapted to be pivotable about the support pins 23b and 23c. Moreover, on the end having of the support pin 23c, a coil spring 30 is mounted so as to normally urge the front cover 23 in a direction of closing.

On the inner or under surface of an upper cover portion 23d of the front cover 23, a pair of spaced bracket portions 23e are provided, and a pair of support pins 24a provided at opposite end portions of the rear cover 24 are received in pin holes 23f formed in the respective bracket portion 23e, and thus, the rear cover 24 is pivotable about the support pins 24a.

Still referring to FIG. 15, at opposite ends of the opening portion 21 of the lower half 20, a pair of tape guides 31 are provided, with the magnetic tape 22 guided by the tape guides 31 being extended along the opening portion 21.

Additionally, at the rear portions of the tape guides 31, a pair of rear cover guide grooves 20b are formed so as to pivotally receive a pair of guide pins 24c formed on protrusions 24b further provided at opposite ends of said rear cover 24 in positions adjacent to the support pins 24a referred to earlier.

Furthermore, on the side of a notched portion 20c of the lower half portion 20, a lock member 32 is pivotally mounted, and further, at the rear side of the lock member 32, a plate spring 33 is held by the lower half portion 20 to urge the lock member 32 forwardly.

Figure 16:
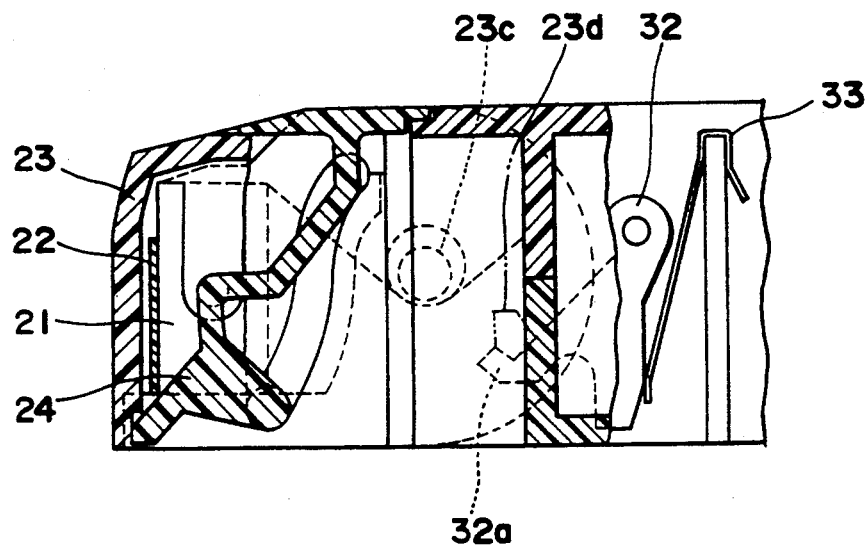
FIGS. 16 to 18 are fragmentary side sectional views of the tape cassette for explaining functioning of the front cover portion of the cassette shell housing.

As shown in FIG. 16, a protrusion 23d provided at one side face 23c of the front cover 23 is normally engaged with a claw portion 32a of the lock member 32 for preventing the front cover 23 from rotation.

With respect to the tape cassette according to the present invention as described so far, the operation thereof will be described hereinafter.

Figure 17:
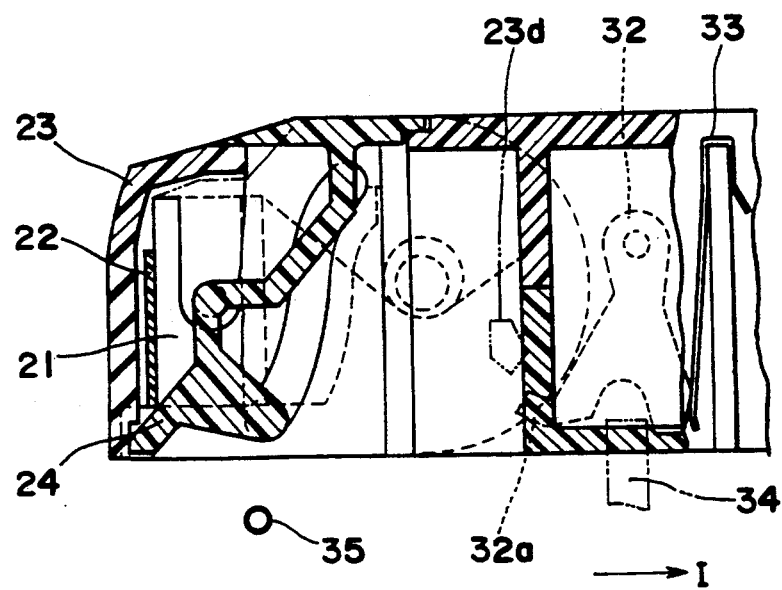

As shown in FIG. 17, when the cassette shell housing 18 of the tape cassette is inserted into a related apparatus (only related portions thereof are shown), a lock releasing member 34 provided at the side of the apparatus is pivoted in a direction indicated by an arrow I toward the plate spring 33, thereby to release the engagement between the protrusion 23d and the claw portion 32a for allowing the front cover 23 to pivot.

Figure 18:
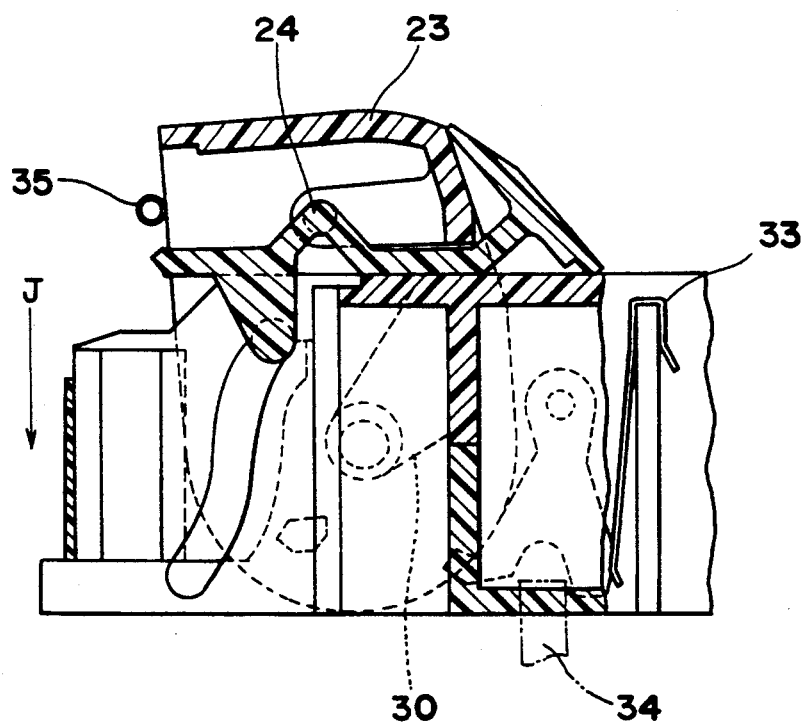

Thereafter, when the cassette shell housing 18 is moved in a direction of an arrow J as shown in FIG. 18, one end of the front cover 23 is pushed up by a cover opening member 35 provided at the side of the apparatus, and therefore, the front cover 23 is pivoted upwardly against the force of coil spring 30. At this time, the rear cover 24 connected with the front cover 23 as described earlier is also opened in association therewith.

Figure 19:
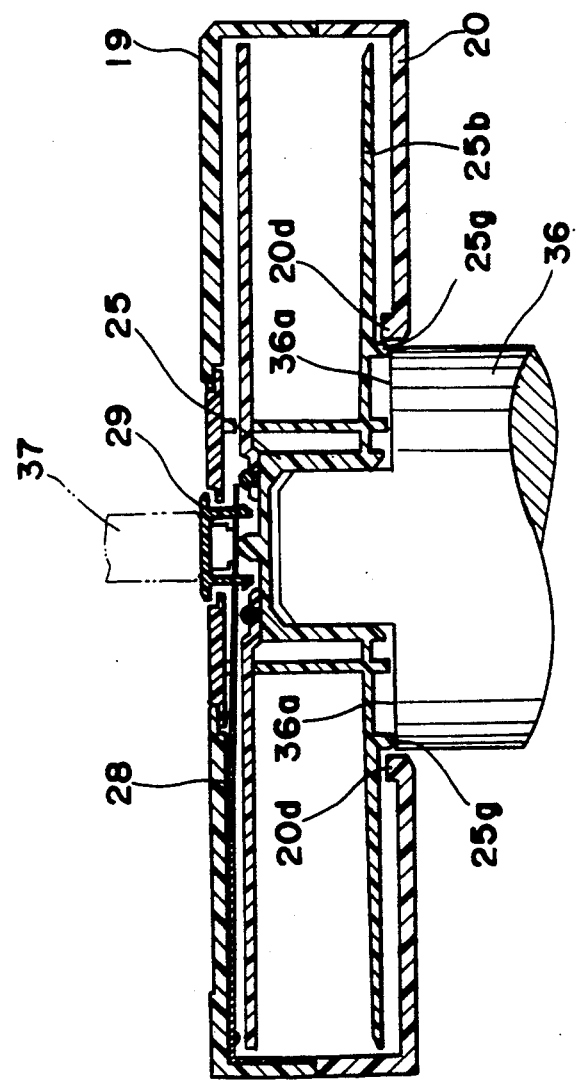
FIG. 19 is a side sectional view of the tape cassette according to the present invention loaded on a reel base at the side of an apparatus.

As shown in FIG. 19, each of the reels 25 is placed, at its lower end face 25g, on a reel receiving face 36a of a reel base 36 provided in the apparatus, and the reel 25 is pushed up against the force of plate spring 28, relative to the protrusion 20d of the lower half portion 20, whereby the lower flange 25b is spaced from the protrusion 20d and the reel 25 is brought into a rotatable state.

In this case, the reel displacing amount reducing member 29 projects upwardly.

Meanwhile, according to the kind of the apparatus to be used outdoors such as a portable VTR or camera incorporated type VTR or the like, each reel 25 is further pressed against the reel base 36 by depressing the member 29 of the cassette shell housing 18, for example, by a reel depressing member 37 provided in the apparatus as shown in FIG. 19. As a result, the reels 25 are not readily separated from the reel bases 36 of the apparatus by impacts or vibrations, thus permitting the magnetic tape to travel stably.

Moreover, if carbon is mixed into the material for the reel displacing amount reducing member 29, and the reel depressing member 37 is composed of an electrically conductive material, electrical charge imparted to the magnetic tape 22 and reels 25 can be advantageously grounded.

Meanwhile, when the tape cassette is accommodated in a cassette case (not particularly shown) during a non-use period, inner surface or protrusions 38 (FIG. 20) provided on the inner surface of the cassette case depress or contact the reel displacing amount reducing members 29 of the cassette shell housing 18, for restricting the movement of the reels 25 in the vertical direction, and consequently, damage to the tape cassette or to the magnetic tape due to vertical movement of the reels during transportation, etc. can be advantageously prevented.

Figure 20:
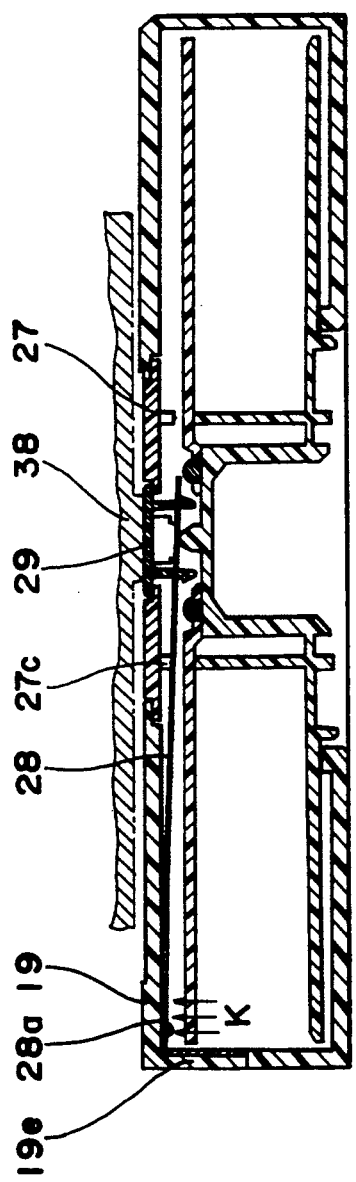
FIG. 20 is a similar view to FIG. 19, which particularly explains a state of application of a stress in a direction indicated by arrows K, FIGS. 21(1a) to 21(3b) are perspective views and cross sections showing modifications of the plate spring according to the present invention.

Since the depressing means for the reels 25 as described so far employs the plate springs 28, the support portion 28a of each plate spring 28 to which the stress of the reel depressing force is applied may be attached to the side-face 19e of the upper half portion 19. In other words, as shown in FIG. 20, when a stress in the direction of arrows K is applied to the support portion 28a of the plate spring 28, to deform the upper wall, it is also necessary to deform the side face 19e similarly, and therefore, the portion in the vicinity of the support portion 28a is not readily subjected to the deformation.

Figure 5:
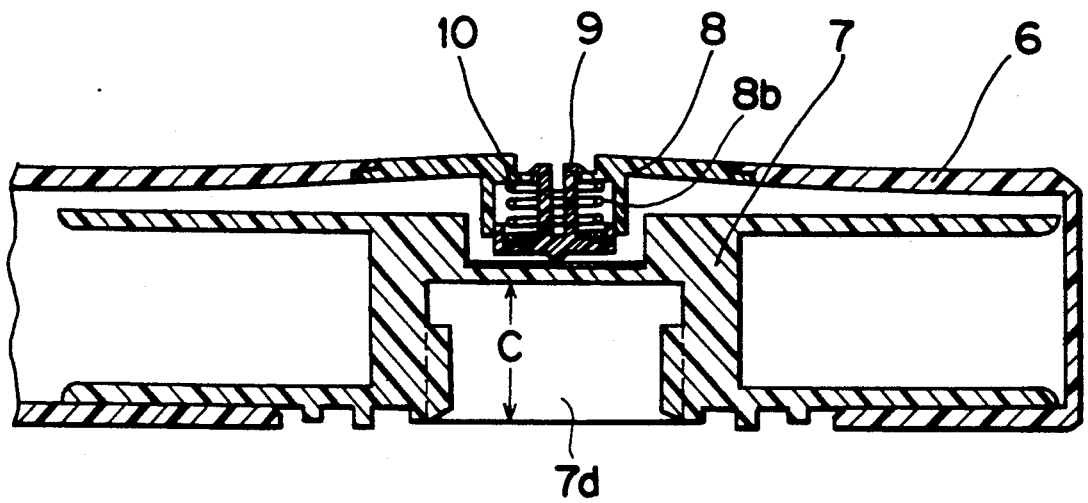
FIG. 5 is a view similar to FIG. 3, which particularly shows a state of deformation of a central portion of the upper wall of the cassette shell housing due to concentration of stress by a coil spring (already referred to)

Thus, according to the present invention, there is available a large effect as compared with the conventional arrangement in that the tape cassette is not readily deformed even when it is left alone for a long period of time, whereas in the conventional tape cassette as shown in FIG. 5, since the stress is concentrated only at the central portion of the upper wall for the upper half portion 19, such upper wall portion is readily deformed as described earlier.

Moreover, according to the tape cassette of the present invention, since no stress is produced at the central portion of the upper half portion 19, the transparent window portion 27 can be readily formed, thereat, and, for the material of the window portion, general transparent materials not particularly requiring high rigidity or heat resistance can be adopted, thus contributing to cost reduction.

Figure 2:
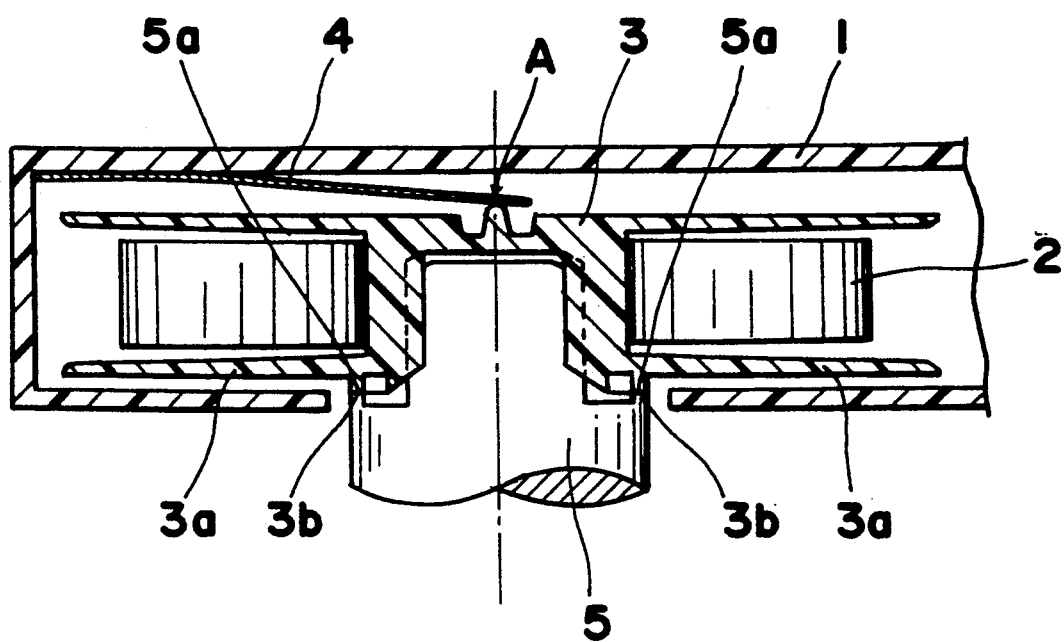
FIG. 2 is a view similar to FIG. 1, which particularly shows a state where the conventional tape cassette is loaded on a reel base of a video tape recorder (already referred to)
Figure 3:
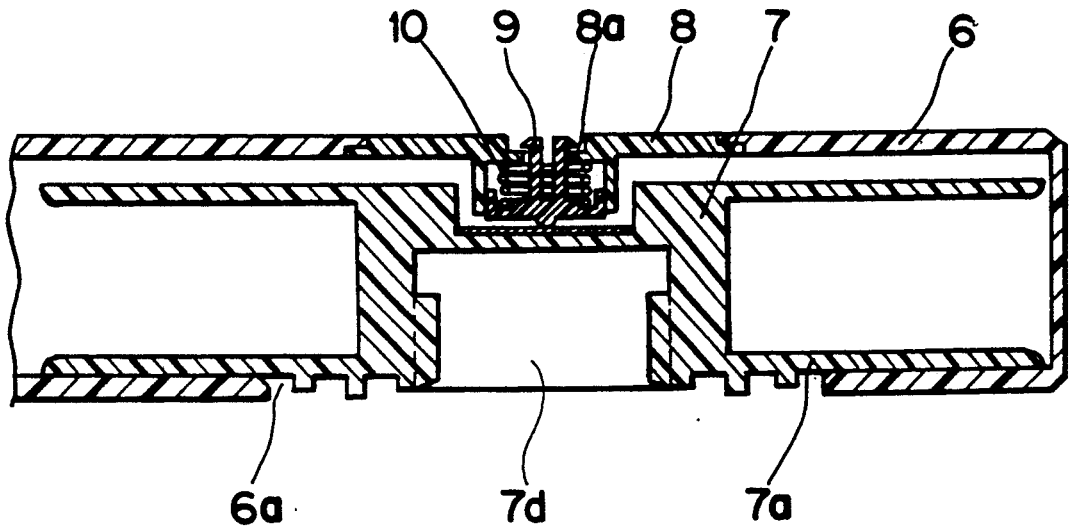
FIG. 3 is a fragmentary side sectional view showing an essential portion of another example of a conventional tape cassette (already referred to)
Figure 4:
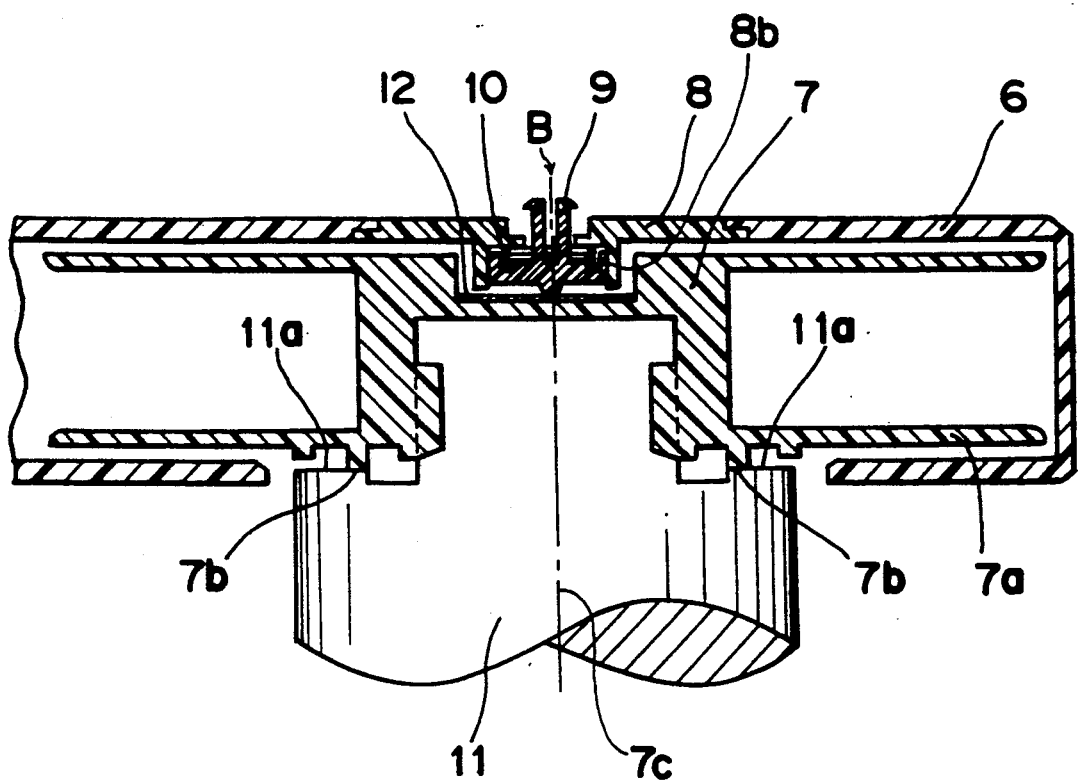
FIG. 4 is a view similar to FIG. 3, which particularly shows a state where the conventional tape cassette is loaded on a reel base of a video tape recorder (already referred to)

The plate spring 28 is made of a metallic material, for example stainless steel, spring steel or the like. Accordingly, at the sliding portion, the metallic members of the plate springs 28 and the resin material of reels 25 are directly slid against each other for lowering of the sliding resistance. In the conventional arrangement also, although the sliding portion is constituted by the metallic member and the resin material, a separate sliding metallic member must be provided as a metallic member different from the coil spring (FIGS. 1 to 3).

According to the embodiment of the present invention as described so far, since the plate spring 28 directly serves as the sliding portion, it may be commonly used as the sliding metallic member as in the conventional arrangement, and thus, an effect for cost reduction may be achieved.

Additionally, since the attaching position of the plate spring 28 to the cassette shell housing 18, and that of the plate spring 28 and the reel displacing amount reducing member 29 are respectively different positions, the shape of the window portion 27 of the cassette shell housing 18 may be simplified. (The large protruding portion 8b for the window portion 8 in the conventional tape cassette is dispensed with). Therefore, the portion engaging the reel base 36 may be provided in any convenient form, since no restriction is required to accommodate for the configuration of the reel 25 located under the window portion 27.

Figure 21:
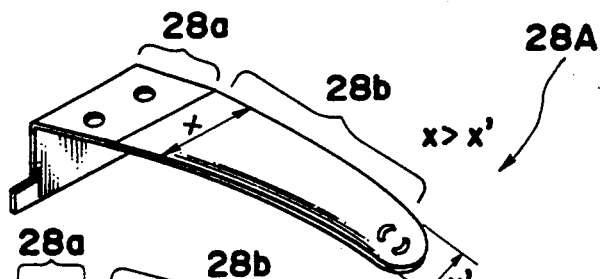
Figure 21:
Figure 21:
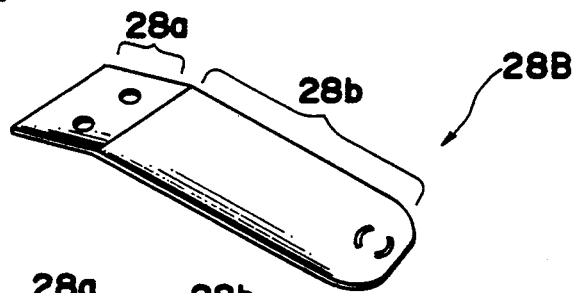
Figure 21:
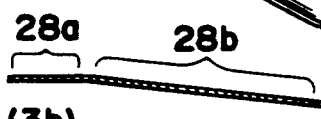
Figure 21:
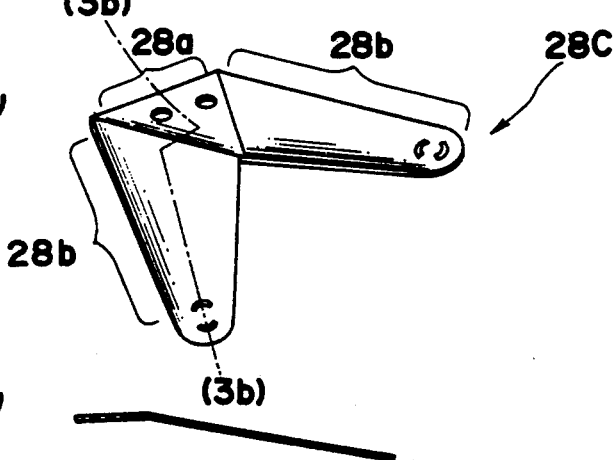
Figure 21:

The shape and structure of the plate spring 18 may be modified in various ways, for example, as shown in FIGS. 21(1a) to 21(3b).

The plate spring 28A shown in FIGS. 21(1a) and 21(1b) has a curved spring portion 28b, and a support portion 28a with a generally L-shaped cross section, and the plate spring 28B in FIGS. 21(2a) and 21(2b) includes a straight spring portion 28b and a flat support portion 28a while the plate spring 28C in FIGS. 21(3a) and 21(3b) has a pair of spring portions 28b integrally combined with a triangular support portion 28a, generally positioned in a V-shape as shown. FIG. 21(3b) shows a cross section taken along the line (3b)—(3b) in FIG. 21(3a). Furthermore, although not particularly shown, for example, the cross sectional shape of the free end portion 28b in the thickness direction can be modified into a curved or straight shape, and thus, with respect to the shape of the plate spring, a combination of the above described structures and configurations or other modifications are possible.

Figure 22A:
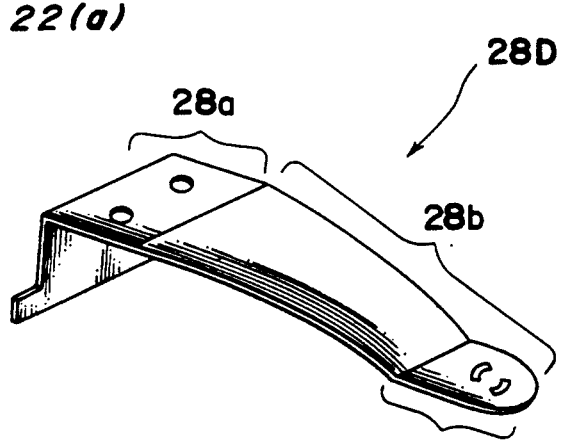
FIGS. 22(a) and 22(b) are perspective views showing further modifications of the plate spring of the present invention.
Figure 22B:
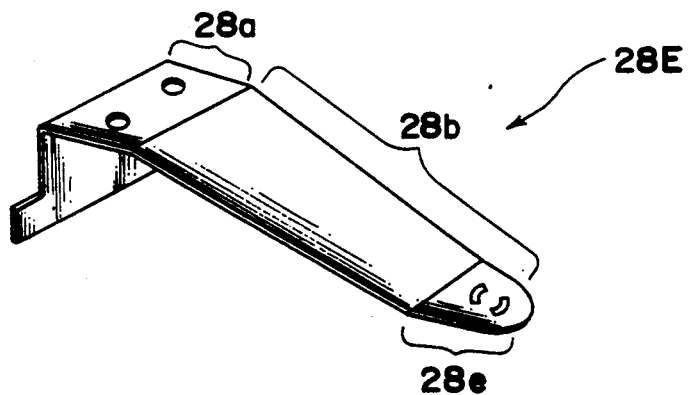

Moreover, when the forward end 28e of the spring portion 28b of the plate spring is further bent upward as shown in the plate spring 28D in FIG. 22(a) or in the plate spring 28E in FIG. 22(b), effects as follows may be obtained.

Figure 23:
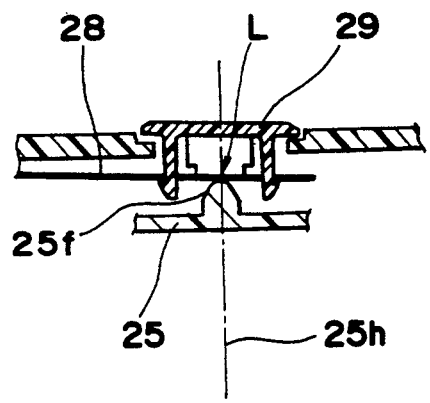
FIG. 23 is a fragmentary cross section showing an essential portion of a tape cassette in which a free end of the plate spring is short.

More specifically, particularly in the case where a sufficiently long length for the spring portion 28b of the plate spring 28 as shown in FIG. 23, cannot be accommodated the direction of the depressing force of the projection 25f for the reel 25 is in the direction indicated by L, and eccentricity is produced in the fitting between the reel 25 and the reel base 36.

As a result, a problem that the travelling of the tape 22 paid out from the reel 25 is not stabilized is brought about.

Figure 24:
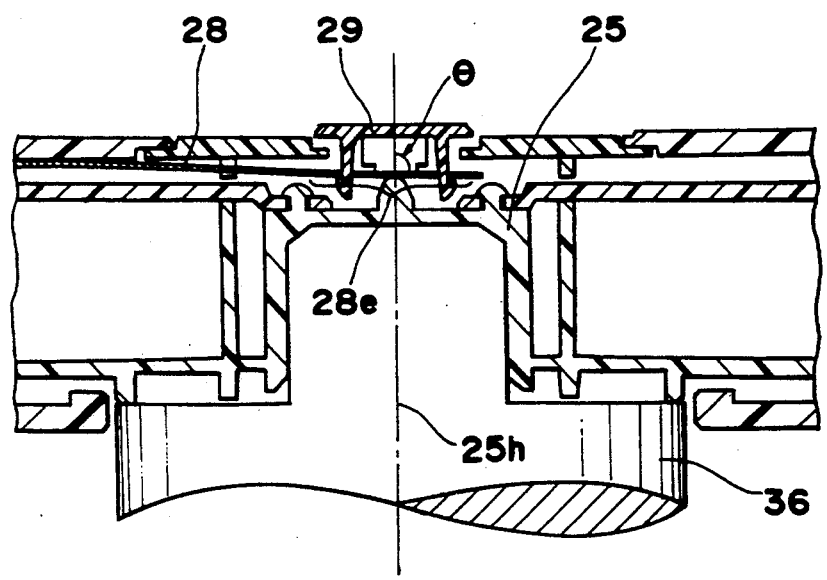
FIG. 24 is a view similar to FIG. 23, in which a reel displacing amount reducing member attaching portion of the plate spring is bent to avoid eccentricity in the fitting with a reel base.
Figure 26A:
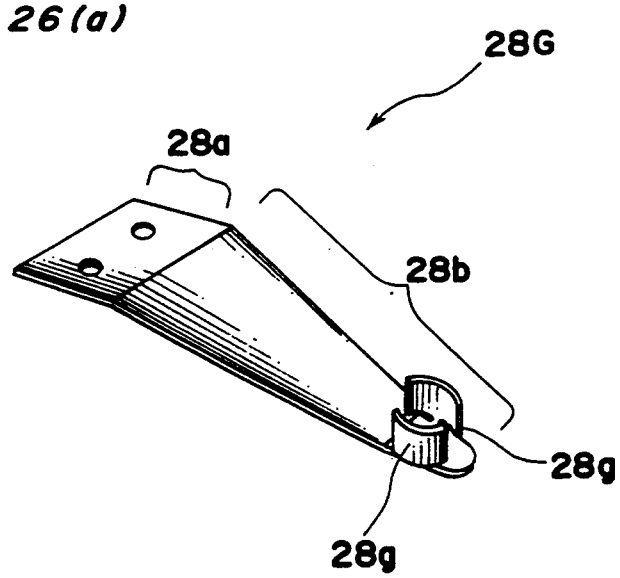
FIGS. 26(a) and 26(b) are a perspective view and a top plan view of a plate spring according to a further modification of the present invention.
Figure 26B:
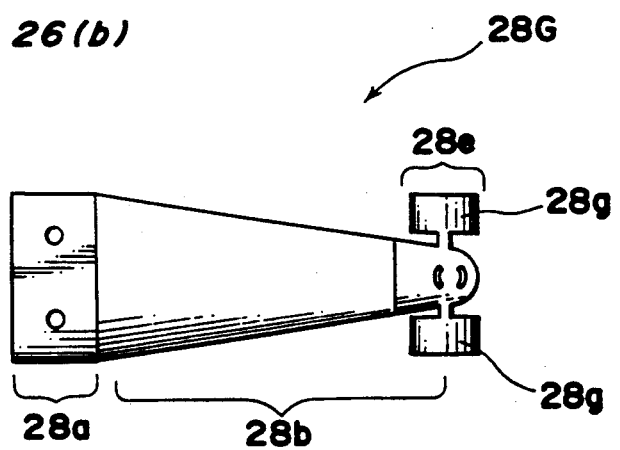

Therefore, as shown in FIG. 24, by arranging to bend the reel displacing amount reducing member attaching portion 28e of the plate spring so as to be approximately at right angles $\theta$ with respect to a center line 25h of the reel 25, the depressing force of the plate spring 28 acts downwardly along the center line 25h of the reel 25, and thus, no eccentricity takes place in the fitting with respect to the reel base 36. Consequently, the travelling of the magnetic tape 22 paid out from the reel 25 is stabilized.

Figure 27:
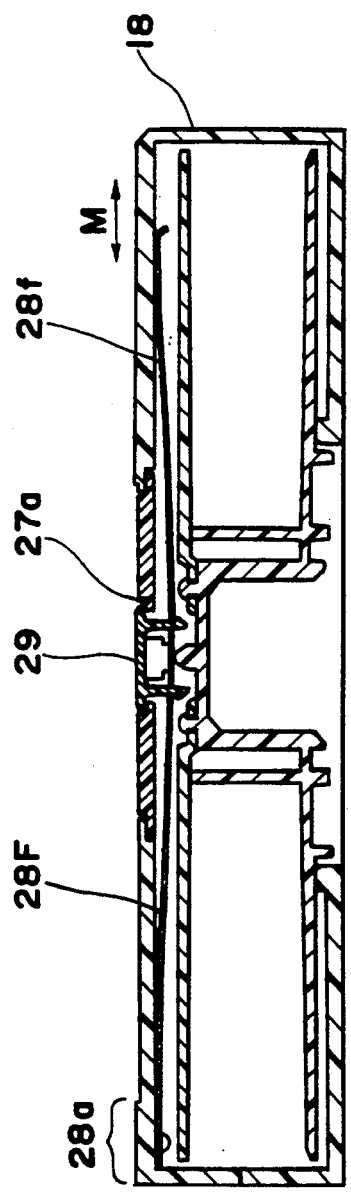
FIG. 27 is a side sectional view of a tape cassette in which the plate spring of FIGS. 25(a) and 25(b) is mounted.
Figure 28:
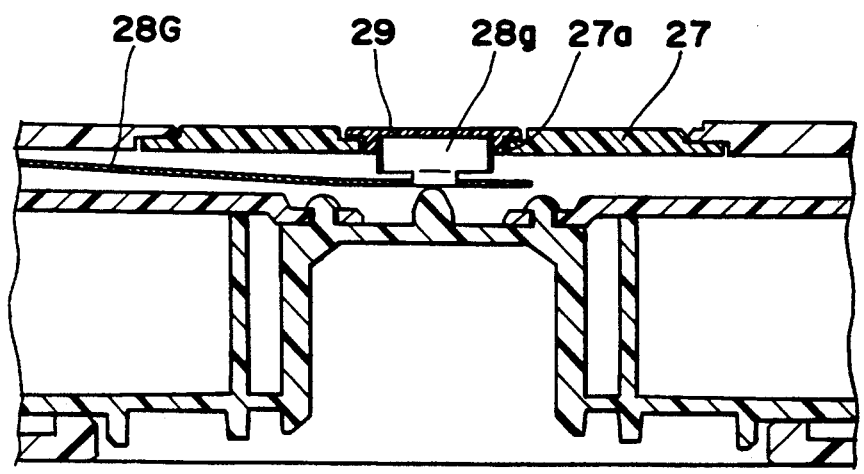
FIG. 28 is a fragmentary side sectional view of a tape cassette in which the plate spring of FIGS. 26(a) and 26(b) is mounted.

FIGS. 25(a) to FIG. 26(b) show further modifications of the plate spring, while FIGS. 27 and 28 show side sectional views of the tape cassette with the plate springs of FIGS. 25(a) and 25(b), and FIGS. 26(a) and 26(b) respectively attached thereto.

The plate spring 28F in FIGS. 25(a) and 25(b) has a generally V-shaped cross section. In FIG. 27, the free end 28f of the plate spring 28F is arranged to be moved in a direction indicated by an arrow M corresponding to the deformation of the plate spring 28F. Meanwhile, the plate spring 28G of FIGS. 26(a) and 26(b) and employed in the tape cassette in FIG. 28 is provided with protrusions 28g at opposite sides of the engaging portion 28e to be engaged with the reel displacing amount reducing member 29, and the respective protrusions 28g are further bent to have a generally arcuate cross section and then bent upwardly from the engaging portion so as to be inserted into the hole 27a of the window portion 27 of the cassette shell housing 18. The reel displacing amount reducing member 29 is shaped to cover the upper face of the protrusions 28g.

Figure 29:
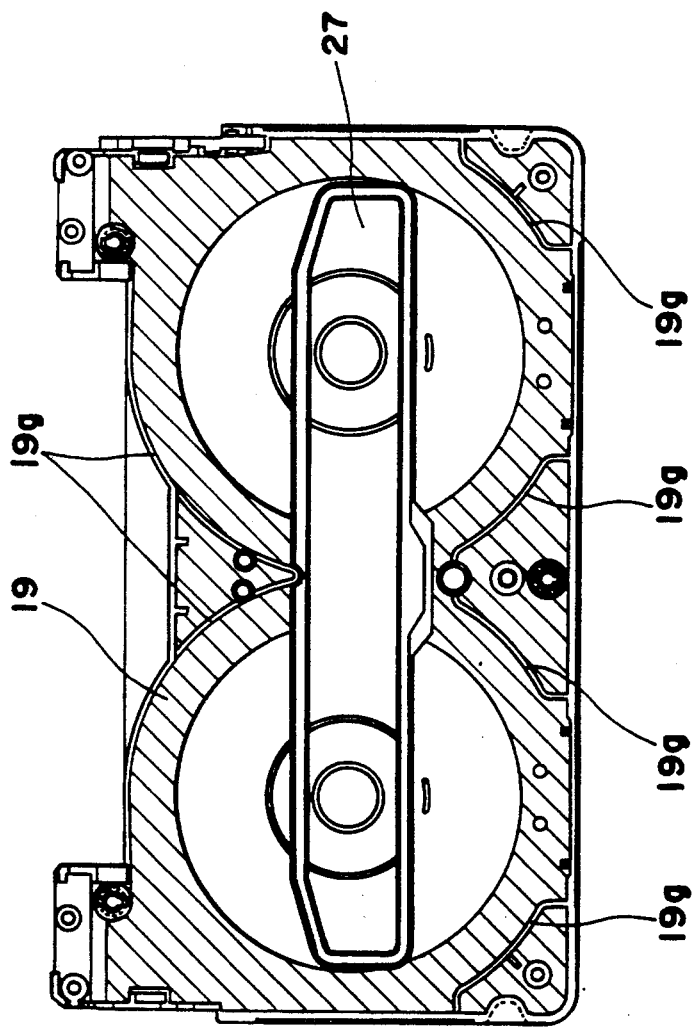
FIG. 29 is a top plan view showing internal construction of the upper half portion of the cassette shell housing of the tape cassette according to the present invention.

It is to be noted here that in the foregoing embodiment, although the attaching portion or the support portion 28a of the plate spring 28 is set to be at the side face of the upper half portion 19 of the cassette shell housing 18, such attaching position may be altered to any other positions having a large rigidity such as a corner portion of the upper half portion 19, a portion for clamping together the upper and lower half portions, a reel position restricting wall 19g or other portions provided with ribs, with high rigidity as shown in hatched portions of FIG. 29 representing the inner structure of the upper half portion 19.

Embodiment II

Figure 30:
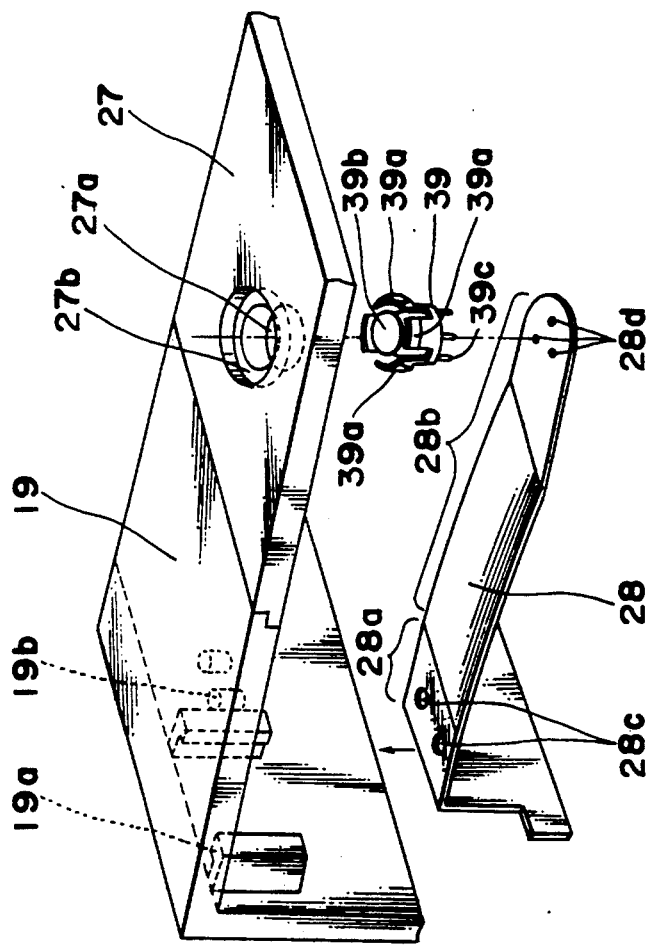
FIG. 30 is a perspective view showing on an enlarged scale, attachment of the reel displacing amount reducing member and plate spring according to a second embodiment of the present invention.
Figure 31:
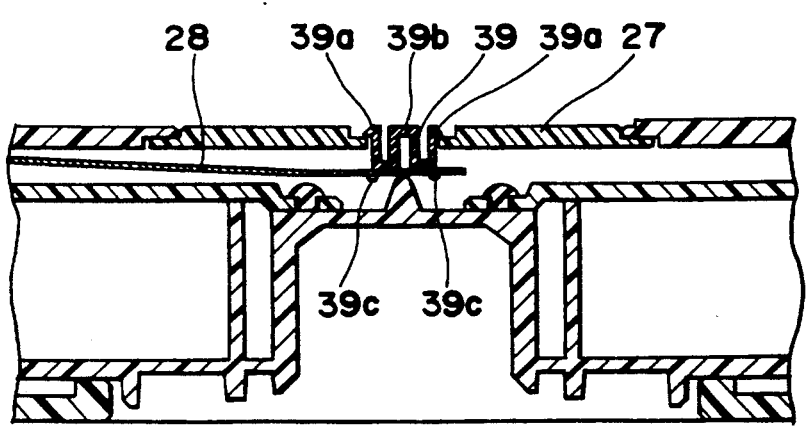
FIG. 31 is a fragmentary side sectional view showing a state where the arrangement of FIG. 30 is assembled in the tape cassette.

Referring further to FIGS. 30 and 31, there is shown a tape cassette according to a second embodiment of the present invention, in which the method of attaching the plate spring and reel displacing amount reducing member is modified as compared with the tape cassette of the first embodiment described so far. Since the attaching method of the plate spring onto the upper half of the cassette shell housing is the same as in the first embodiment, detailed description thereof is omitted for brevity, with like parts being designated by like reference numerals.

In FIGS. 30 and 31, the modified reel displacing amount reducing member 39 molded of a synthetic resin material is provided, at its upper face side, with a plurality of claw portions 39a as an engaging means with the recess 27b of the window portion 27, and has a cylindrical rib 39b as the central portion of the upper face, with a plurality of projecting pieces 39c extending downwardly from its lower face.

In the above arrangement of FIGS. 30 and 31, for attaching the reel displacing amount reducing member 39 to the plate spring 28, the projecting pieces 39c of the member 39 are inserted into holes 28d formed at the forward end of the free end 28b of said plate spring 28 which correspond in number to the projecting pieces 39c, and the member 39 is attached to the plate spring 28 by fusing and enlarging forward ends of the projecting pieces 39c extended through the holes 28d.

Subsequently, the claw portions 39a of the member 39 are forced into the hole 27a provided in the window portion 27 of the cassette shell housing 18 and having an external diameter slightly smaller than that of a circle formed by connecting the claw portions 39a. When the claw portions 39a have passed through the hole 27a, they are elastically expanded to be caught by the annular recess 27b of the window portion 27 for positioning.

It should be noted here that since the cylindrical rib 39b of the member 39 is located at the central portion thereof and has a flat shape on its upper surface, the top face shape thereof is the same as that of the reel displacing amount restricting member 29 of the first embodiment, and therefore, the configurations of the inner surface or projections in the inner surface of the tape cassette storing case (not shown) or the reel depressing member at the side of the apparatus (not shown) may be arranged to be common with those in the first embodiment.

Needless to say, the shape of the plate spring 28 may also be modified in various ways in a similar manner as in the first embodiment.

By the above arrangement of the second embodiment, the same effects as in the first embodiment can also be achieved.

Although two examples are shown of the shapes and constructions of the reel displacing amount reducing member, various modifications are of course possible based on the technical concept of the present invention.

As described above, by the arrangement of the second embodiment, the undesirable deformation of the cassette shell housing can also be prevented, and the less expensive transparent window portion can be provided at the central portion on the upper surface of the cassette shell housing, while the sliding metallic part as required in the conventional arrangement can be advantageously dispensed with.

As is seen from the above description, through employment of the plate spring as the depressing means of the reels, it becomes possible to prevent the deformation of the cassette shell housing conventionally taking place, and also to provide the window portion forming the upper central portion of the cassette shell housing of an inexpensive transparent material. Additionally, since the separate metallic member is not required at the sliding portion with respect to the reel, still more cost reduction may be achieved.

Furthermore, by forming the reel displacing amount reducing member attaching portion of the plate spring generally parallel with said reel displacing amount reducing member by bending of said attaching portion of the plate spring, the protrusion of the restricting member from the cassette shell housing can be prevented with simultaneous facilitation of connection between the reel position restricting member and the plate spring.

As is clear from the foregoing description, since the tape cassette according to the present invention includes the cassette shell housing in which the reel means wound with the magnetic tape thereon is incorporated, the depressing means for depressing the upper surface of the reel means, and the reel displacing amount reducing means having its one end engaged with the depressing means, and its other end, exposed on the upper surface of the cassette shell housing through the through-hole formed in the cassette shell housing, and the amount of displacement of said reel means is arranged to be reduced by restricting displacement of the exposed portion of the reel displacing amount reducing means, the following effects are obtained.

(1) When the tape cassette is housed in the cassette storing case, by engaging the exposed portion of the reel displacing amount reducing means with the inner face of the storing case, the vertical movement of the tape can be suppressed for the prevention of the damage to the magnetic tape.

(2) By bending the reel displacing amount reducing means attaching portion of the plate spring approximately at right angles with respect to a center line of the reel, eccentricity as the fitting portion with respect to the reel base is prevented.

(3) By attaching one end of the plate spring at the side face portion, corner side portion, or clamping portion between the upper and lower halves, which generally have large rigidity in the cassette shell housing, deformation of the cassette shell housing may be prevented.

(4) Owing to the arrangement to cause the plate spring to directly slide against the reel, a sliding metallic member can be dispensed with for cost reduction.

(5) Since the attaching position of the plate spring to the cassette shell housing, and that of the plate spring and the reel displacing amount reducing means are respectively provided at different positions, the shapes at the respective attaching portions are simplified.

(6) For the reason as stated in the above item (5), the reel may be formed into a shape to which the reel base can be fitted stably.

Thus, according to the present invention, remarkable effects as set forth above can be achieved.

Although the present invention has been fully described by way of example with reference to the accompanying drawing, it is to be noted here that various changes and modifications will be apparent to those skilled in the art. Therefore, unless otherwise such changes and modifications depart from the scope of the present invention, they should be construed as included therein.

What is claimed is:

1. A tape cassette comprising:
   a cassette shell housing having a through hole therein;
   a reel means rotatably mounted in said housing for rotation around a reel axis and made of a synthetic resin and adapted to have a magnetic tape wound thereon, and displaceable in said housing in the direction of said reel axis;
   a flat plate-like metallic plate spring having a base end fixed to an inner face of said housing and a free end directly engaging and urging an upper surface of said reel means in the direction of said reel axis toward a wall of said housing on the opposite side of said housing from said through hole; and
   a reel displacing amount reducing means having an engaging portion within said housing engaging said plate spring and an exposed portion extending through said through hole, said reel displacing amount reducing means being movable in said through hole in the direction of said reel axis between a projected position in which said exposed portion projects outside said housing and a retracted position in which said exposed portion is within said through hole, and said engaging portion urges said plate spring against said reel means in resilient engagement therewith to urge said reel means against the wall of said housing on the opposite side of said housing from said through hole for holding said reel means against movement within said housing.

2. A tape cassette as claimed in claim 1 wherein the material of said displacing amount reducing means includes carbon.

3. A tape cassette as claimed in claim 1 further comprising a reel displacing amount reducing protrusion on an inner face of said housing for reducing the displacement of said reel means.

4. A tape cassette as claimed in claim 1, in which said free end of said plate spring has a depressing portion bent generally parallel with the upper surface of said reel means and engaged with said reel means.

5. A tape cassette as claimed in claim 1 or 4 wherein said reel means has a projection at a central portion on the surface facing said plate spring, said projection being engaged by said plate spring for urging said reel means.

6. A tape cassette as claimed in claim 5, wherein said engaging portion of said reel displacing amount reducing means has projection means extending into said housing and to which said plate spring is connected, said projecting means having a length for, when said reel displacing amount reducing means is in the retracted position, holding said plate spring in contact with said projection on the upper surface of said reel means.

7. A tape cassette as claimed in claim 5 wherein said reel means comprises two reels and said displacing amount reducing means comprises two displacement amount reducing members, one corresponding to each reel, and said plate spring has two free ends, one at each of said displacing amount reducing members and engaging a corresponding reel.

8. A tape cassette as claimed in claim 5 wherein said exposed portion of said displacing amount reducing means has a flange portion for engaging the through hole in said housing.

9. A tape cassette as claimed in claim 8 wherein said free end of said plate spring has an engaging hole therein, and said displacing amount reducing means comprises a projecting piece on said displacing amount reducing means extending through said through hole and having a forward end of said projecting piece enlarged, and a further projecting piece on said displacing amount reducing means engaging with the face of said free end of said plate spring which faces toward said engaging portion.

10. A tape cassette as claimed in claim 5 wherein said free end of said plate spring has an engaging hole therein, and said displacing amount reducing means comprises a projecting piece on said displacing amount reducing means extending through said through hole and having a forward end of said projecting piece enlarged, and a further projecting piece on said displacing amount reducing means engaging with the face of said free end of said plate spring which faces toward said engaging portion.

11. A tape cassette as claimed in claim 5 wherein the face of the exposed portion of said displacing amount reducing means which faces outwardly of said housing is free of concave and convex portions.

12. A tape cassette as claimed in claim 11 wherein an outer periphery of the exposed portion of said displacing amount reducing means has a face inclined outwardly and toward said housing.

13. A tape cassette as claimed in claim 5 wherein said free end of said plate spring has an engaging hole therein and said engaging portion on said displacing amount reducing means comprises a claw portion on said displacing amount reducing means engaged in said through hole.

14. A tape cassette as claimed in claim 5 wherein said plate spring has, along the length of said plate spring, a straight spring portion and a flat support portion at an obtuse angle to said straight portion.

15. A tape cassette as claimed in claim 5 wherein a cross-section taken along the length of said plate spring is substantially L-shape.

16. A tape cassette as claimed in claim 5 wherein a cross-section taken along the length of said plate spring is substantially V-shape.

17. A tape cassette as claimed in claim 5 wherein coupling means is provided for engaging said plate spring and said displacing amount reducing means, said coupling means comprising projecting elements at opposite sides of said plate spring, said projecting elements being bent at substantially right angles to the free end of said plate spring, said projecting elements being engaged in a recess in said engaging portion of said displacing amount reducing means.

18. A tape cassette as claimed in claim 5 wherein coupling means is provided for engaging said plate spring and said displacing amount reducing means, said coupling means comprising projecting elements at opposite sides of said plate spring, said projecting elements being bent at substantially right angles to the free end of said plate spring, said plate spring having a through hole therein and a claw portion on said displacing amount reducing means engaged in said through hole and holding said displacing amount reducing means against the free ends of said bent projecting elements.

* * * * *